ACOUSTIC WELL LOGGING WITH END SHIELDING

Original Filed March 12, 1952 4 Sheets-Sheet 1

WILLIAM C. OVERTON JR.

INVENTOR.

BY D. Earl Richards

ATTORNEY

ACOUSTIC WELL LOGGING WITH END SHIELDING

Original Filed March 12, 1952 4 Sheets-Sheet 2

WILLIAM C. OVERTON JR.

INVENTOR.

BY D. Earl Richards

ATTORNEY

ACOUSTIC WELL LOGGING WITH END SHIELDING

Original Filed March 12, 1952 4 Sheets-Sheet 3

WILLIAM C. OVERTON JR.

INVENTOR.

BY O. Earl Richards

ATTORNEY

WILLIAM C. OVERTON JR.
INVENTOR.

BY D. Earl Richards
ATTORNEY

United States Patent Office

Re. 24,931
Reissued Jan. 31, 1961

24,931

ACOUSTIC WELL LOGGING WITH END SHIELDING

William C. Overton, Jr., Prince Georges County, Md., assignor, by mesne assignments, to Socony Mobil Oil Company, Inc., a corporation of New York Original No. 2,878,886, dated Mar. 24, 1959, Ser. No. 276,095, Mar. 12, 1952. Application for reissue Oct. 21, 1959, Ser. No. 847,855

16 Claims. (Cl. 181—.5)

Matter enclosed in heavy brackets [ ] appears in the original patent but forms no part of this reissue specification; matter printed in italics indicates the additions made by reissue.

This invention relates to acoustic well logging and more particularly to the use of cylindrical waves in a bore hole substantially free of end-effects. In a more specific aspect the invention relates to the generation of cylindrical waves for transmission to formations adjacent a bore hole and the measurement of characteristics of a selected portion of the cylindrical wave thus generated.

It is known to log various earth formations penetrated by a bore hole by moving through the bore hole an acoustic generator and measuring the reaction of the formations upon the generator. For example in the Patent 2,530,971 to Kean there is disclosed a system in which symmetric waves are generated in a bore hole, the waves having a wave length that is long compared with the length of the transmission path through liquid filling an annular space between the acoustic generator and the walls of a bore hole.

From a study of the propagation of acoustic energy from a long axially symmetrical cylindrical source radiating sound waves through a bore hole liquid and thence to surrounding earth formations penetrated by the bore hole, in the general case of arbitrary [acoustice] *acoustic* wave frequencies utilizing approximate boundary conditions at the wall of the bore hole and at the cylindrical source radiating into the bore hole liquid, it has been found that the solution for acoustical energy and the mechanical driving point impedances at the wall of the cylindrical source are complicated indeed. The functions contributing to the foregoing factors are density, shear modulus and bulk modulus of the earth formations adjacent the source, and the density and bulk modulus of the bore hole liquid. The conditions encountered in actual field operations make analysis most difficult.

However for a low frequency case, that is for frequencies less than 200 cycles per second, the complicated solutions for the energy imparted to the formations and for the mechanical driving point impedances are greatly simplified. For the low frequency case a simple relationship between density and shear modulus may be recorded directly.

However, in both the general case or the restricted low frequency case the acoustic energy and the mechanical driving point impedance are readily determinable only if the cylindrical source does not have finite dimensions. The character of the wave radiating from the center of the source is truly cylindrical but at the ends the radiation is non-cylindrical, approaching spherical waves and requires an understanding of end radiation effects and a correction therefor if the functions recorded are to be completely understood. Although corrections can be applied by computational methods, the corrections may vary in an indeterminate way if the logging instrument is moved past earth formations of varying density and shear modulus. Thus the desirability of providing an acoustic logging system independent of end radiations even though of finite length is most desirable.

By the present invention there is provided an improved acoustic logging system in which axially symmetrical cylindrical waves are generated and characteristics of a predetermined portion of the wave are measured. More particularly, applicant provides a method for acoustic logging in which an exploring element is used to log a liquid filled bore hole. The method includes the steps of driving the exploring element to generate an axially symmetric wave with the element in a homogeneous medium in which condition the amplitude of the wave is adjusted to a predetermined level over substantially the entire length of the element so that over an intermediate section of the element the axially symmetric wave is cylindrical. The element is then moved through the bore hole past the formations adjacent thereto to modify the wave over the length of the element in dependence upon the acoustic properties of the formations and variations in the wave over a preselected intermediate fraction of the length of the element are measured for determination of variations in the acoustic properties of the formations.

In a more specific aspect of the invention a first portion of the exploring element is driven from a low frequency energy source to generate an axially symmetric wave acoustically to couple formations adjacent the latter portion to the exploring element. Portions of the exploring element above and below the first portion are driven in phase with the first portion for generation of axially symmetric waves to couple adjacent formations to the portions of the element above and below the first portion. The amplitude of the waves from all portions of the element are then adjusted to substantially the same level to assure a wave cylindrical in form adjacent the first portion. The exploring element is then moved through the bore hole to modify the waves from the several portions of the element in dependence upon the acoustic properties of the formations, and variations in the wave from the first portion are measured for determination of variations in the acoustic properties of the formations adjacent the first portion only.

In accordance with a further aspect of the invention, applicant provides a plurality of radiating members supported in an end-to-end relation with means for driving the radiating members in phase to generate axially symmetric acoustic waves in the formations adjacent thereto. The system is provided with means for adjusting the amplitude of the waves from each of the radiating members to a preselected value. The end members serve as acoustic guards for intermediate members so that as the exploring system is moved through the bore hole the intermediate members radiate energy substantially independent of end-effects, and measurements made of the characteristics of the wave produced by the intermediate members are then independent of end-effects and dependent principally upon a restricted section of the formations adjacent only the intermediate member.

Further applicant provides automatic power controlling means for each of the individual radiating members. Means responsive to the amplitude of vibration of each of the members produce voltages which are utilized to control the power delivered to the several members. The power required to maintain constant the amplitude of a cylindrical wave of low frequency is dependent principally upon formation density and shear modulus. Applicant provides a means for measuring variations in the power required to maintain constant the amplitude of a cylindrical wave, the wave being maintained cylindrical over a discrete measuring section by utilization of the end guard radiators.

For a further understanding of the present invention and for a more detailed description thereof, reference may now be had to the following description taken in conjunction with the accompanying drawings in which:

Fig. 1 [is a diagrammatic representation of] *illustrates* an end shielded acoustic logging system;

Figure 1:
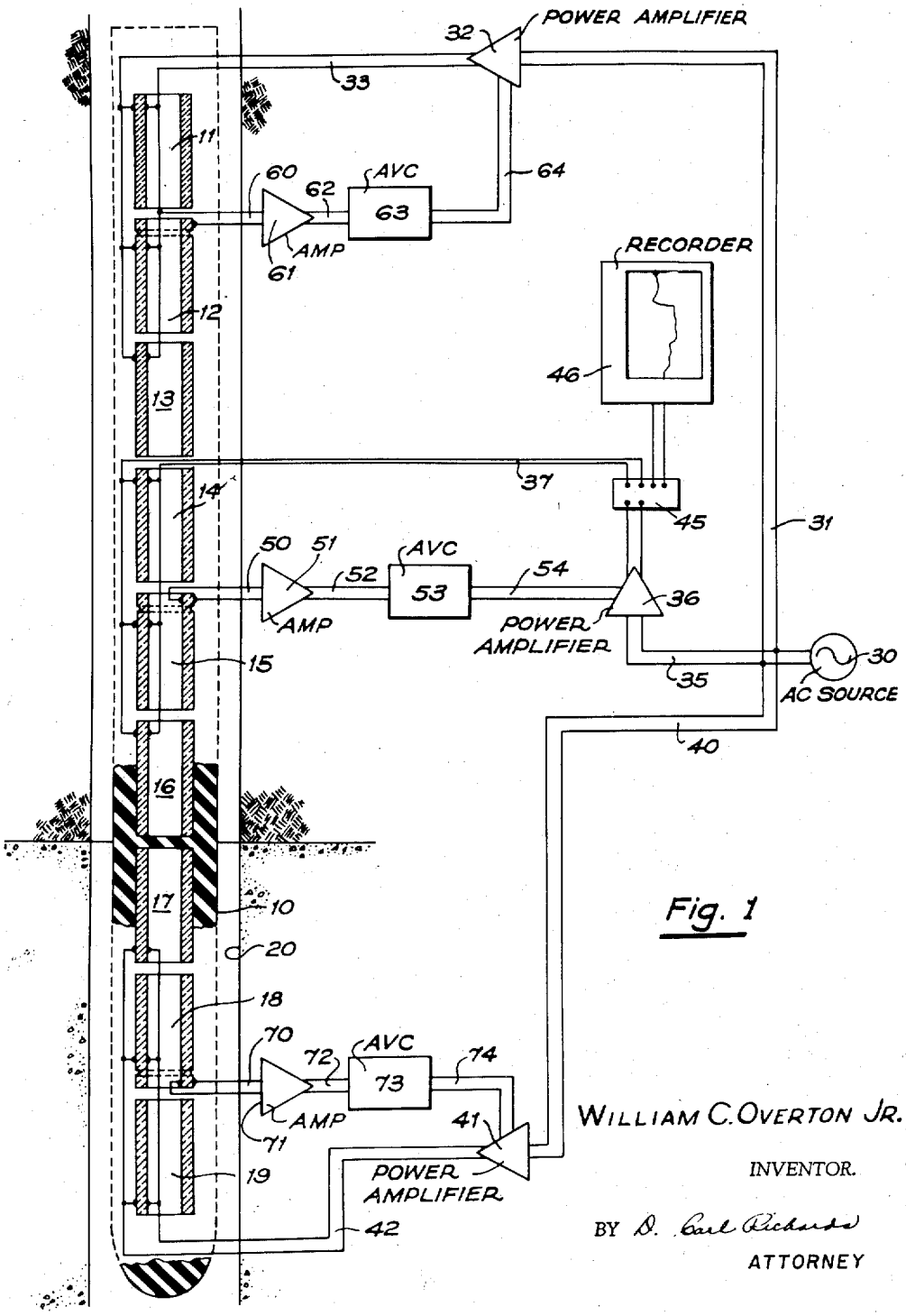

Referring now to Fig. 1, there is illustrated one form of an exploring tool in the form of an elongated acoustic radiating element which includes a rubber sheath 10 completely enclosing a plurality of cylinders 11—19. The cylinders 11—19 are supported in an end-to-end relation and together form a composite elongated cylindrical radiator. The rubber sheath, whose periphery 10 has been indicated by a dotted outline, has been broken away in order more clearly to show the associated elements of the system.

The cylindrical elements 11—19 preferably are piezoelectric crystals, for example of barium titanite, having a first electrode coated on the inner surface of each cylinder and a second electrode coated on the outer surface of the cylinder. Upon application of an electrical potential to the electrodes, the radial dimensions of the crystals change. When a signal is simultaneously applied to all of the elements 11—19, there is produced a cylindrical wave symmetrical to the axis of the bore hole 20, causing acoustic energy to travel through liquids in the bore hole surrounding the sheath 10 and into the formations adjacent the bore hole 20.

In accordance with the present invention, the radiator comprised of the elements 11—19 is divided into a plurality of discrete elements each of which is separately excited by energy preferably from a low frequency alternating current source. As illustrated, an alternating current source 30 whose output preferably is sinusoidal is connected by way of a first channel 31 to a power amplifier 32. The output of the amplifier 32 is then applied by way of channel 33 to each of the cylinders 11, 12 and 13. The cylinders are connected in parallel to the channel 33 so that the A.C. voltage from the amplifier 32 produces sinusoidal variations in the dimensions of cylinders 11—13.

Similarly, the source 30 is connected by way of channel 35 to power amplifier 36. An output channel 37 leading from amplifier 36 is connected to the centrally located elements 14, 15 and 16, the latter being parallel connected to channel 37. A third channel 40 is connected between the source 30 and a third power amplifier 41. The output channel 42 from amplifier 41 is connected to the lower elements 17, 18 and 19.

It will thus be seen that the bore hole unit is comprised of a first section 11, 12, 13 driven from a first amplifier 32, a second or intermediate section 14, 15, 16 driven from a second amplifier 36, and a third or lower section 17, 18, 19 driven from a third amplifier 41 where the amplifiers 32, 36 and 41 are driven from the common source 30. Therefore the elements 11—19 are driven in phase so that the wave produced in a homogeneous medium would be the same as produced by a single radiating element of corresponding length. By individually driving discrete sections, it is possible to measure characteristics of the wave, or of a selected portion of the wave, without introduction of indeterminate errors due to radiation from the ends of the system.

For example, it has been determined that the total energy required to drive a selected portion of a radiator such as illustrated in Fig. 1 has the following relation at low audio frequencies to parameters of the earth formations:

$$E=\frac{\pi\omega 3_L 2_a}{4}\left(\frac{\rho_2}{1+\left[\frac{b^2-a^2}{b^2}\right]\frac{\mu_2}{k_1}}\right) \qquad (1)$$

where:

$\omega=2\pi\times$the frequency of excitation;

L is the amplitude of vibration of the piezoelectrical cylinders 11—19;

$\rho_2$ is the density of formations;

b is the radius of the bore hole 20;

a is the radius of the logging tool;

$\mu_2$ is the shear modulus of the formations adjacent the bore hole; and $k_1$ is the bulk modulus of the fluid in the annulus between rubber sheath 10 and the walls of the bore hole 20.

The foregoing equation is the low frequency approximation of a general solution of a cylindrical radiating system valid for frequencies below 200 cycles per second for cylindrical waves symmetrical with respect to the axis of the bore hole *20* [10]. It will be seen that if the bore hole radius (b) remains constant and if the amplitude of the cylindrical waves also is maintained constant by operation of the system, the only variables effecting the total energy wil be the density $\rho_2$ and the shear modulus $\mu_2$ of the adjacent formations. A log dependent upon such parameters presents in bold relief the location of interfaces between formations of different character.

The wave produced by the system of Fig. 1 is not a cylindrical wave in its entirety for the reason that the radiating system has finite length. However applicant provides the end shielding members 11, 12, 13, 17, 18 and 19 for the central section 14, 15 and 16 so that the energy required to drive the central elements 14, 15 and 16 at a constant amplitude while moving the exploring tool throughout the length of the bore hole will be the same as if the wave were entirely cylindrical. The energy then varies directly as the density of the formations adjacent the intermediate or central section and inversely as the shear modulus of the formations. In Fig. 1 a *wattmeter* [thermocouple element] 45 is connected in circuit with the channel 37 and to a recorder 46 in such manner that the *output signal produced by the wattmeter is representative of* [voltage produced by the thermocouple element is proportional to] the power output of the amplifier 36.

In order to maintain constant the amplitude of vibration of the elements 14, 15 and 16 the electrode on the outer surface of the cylinder 15 is milled or grooved at a point intermediate the ends thereof and a detecting circuit including conductors 50 connected to the insulated section detects the voltage produced by variation of the dimension of the cylinder. The cylinder 15 then serves both as a driver and detector as will be described in greater detail in connection with Fig. 2. The voltage on channel 50 is applied to an amplifier 51 whose output circuit is connected by way of channel 52 to an automatic volume control circuit 53. The output of the automatic control circuit is connected by way of channel 54 in a gain controlling relation (later described in detail) to the power amplifier 36.

In a similar manner a voltage detected in the upper section, from the cylinder 12, is applied by way of channel 60 to an amplifier 61. Amplifier 61 is connected by way of channel 62 to a second AVC circuit 63 for applying by way of channel 64 a gain control voltage to the power amplifier 32. The voltage appearing on channel 70, proportional to the amplitude of vibration of the cylinder 18 is applied to amplifier 71. The output of amplifier 71 is connected by way of channel 72 to a third AVC circuit 73 for applying by way of channel 74 a gain control voltage to the power amplifier 41.

In operation, with the exploring tool including the cylinders 11—19 in a homogeneous medium or in air, the low frequency sinusoidal signal is applied from source 30 by way of amplifiers 32, 36 and 41 to the cylinders 11—19 to produce axially symmetric acoustic waves in the adjacent formations. The AVC circuits 53, 63 and 73 are adjusted for equal amplitudes of vibration of the three sections of the radiating unit. The unit is then lowered through the bore hole to acoustically couple adjacent formations to the system. Since the levels of the outputs of amplifiers 32, 36 and 41 were initially adjusted for equal amplitudes of vibration of the associated crystals, the portion of the wave produced by the central section 14, 15, 16 will be a true cylindrical wave and the power required to maintain constant the amplitude of the wave produced by that portion of the radiating system varies principally in dependence upon density and shear modulus.

As the system is lowered into the bore hole past different formations, the AVC circuits 53, 63 and 73 automatically maintain the amplitude of vibration of all elements constant so that the character of the wave is truly cylindrical over the length of the bore hole corresponding to the central section of the radiator. Reliance may then be placed upon the measurement of the energy to the central section 14, 15, 16.

In Fig. 1, the electrical components, the source, amplifiers and the AVC circuits have been illustrated in a manner most convenient to an understanding of the operation of the system. It is to be understood that the components may be positioned at the surface of the earth with the recorder 46 and connected to the bore hole system by way of a multi-conductor cable. Alternatively selected portions of the electrical system may be housed in a suitable pressure resistant casing mechanically secured to the upper end of the rubber sheath 10. Such expedients are well known and understood by those skilled in the art and have therefore not been described in detail.

Figure 2:
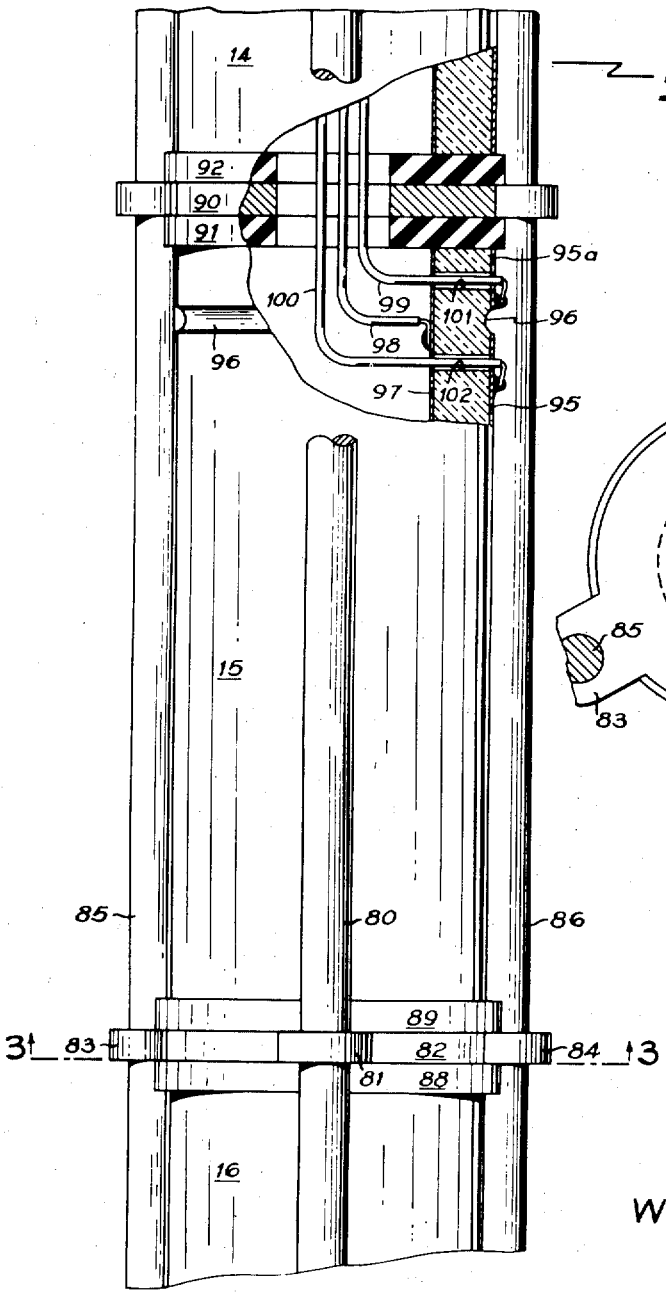
Fig. 2 is an enlarged view *illustrating details* of a portion of the radiator of Fig. 1.
Figure 3:
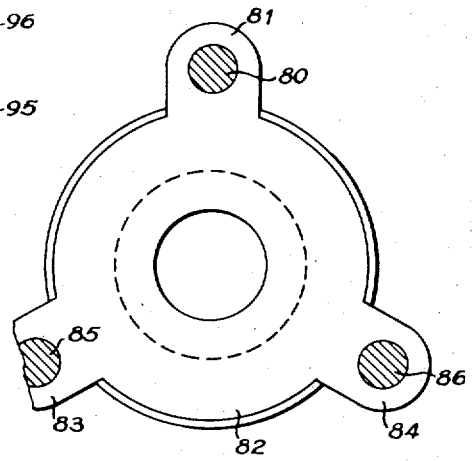
Fig. 3 is a sectional view taken along line 3—3 of Fig. 2.

Referring now to Fig. 2, there is illustrated a portion of the radiating system of Fig. 1 showing the cylindrical crystal 15 with the mechanical supporting means and electrical connections therefor. Crystal 15 is supported by a plurality of rods 80, 85 and 86. Rod 80 passes through a lug 81 best illustrated in Fig. 3. Lug 81 is an integral part of a supporting washer 82 which also has lugs 83 and 84 positioned 120° along the periphery of washer 82 from lug 81 and from each other. The additional supporting rods 85 and 86 pass through openings in the lugs 83 and 84. Referring again to Fig. 2, spacers 88 and 89 are positioned on opposite sides of the washer 82 to cushion the associated crystals. Spacers 88 and 89 preferably are of rubber. Crystal 15 is spaced from the washer 82 by spacer 89. Similarly the cylinder 16 is spaced from the washer 82 by the spacer 88. Rods 80, 85 and 86, Fig. 2, extending the full length of the radiating system of Fig. 1 and suitably terminated in end members (not shown), may provide a relatively rigid suporting means for the radiating elements without modifying the wave produced.

Similar spacing means are provided intermediate each of the crystal cylinders, the washer 90 and spacers 91 and 92 separating the crystal 15 from crystal 14.

It will be noted in Fig. 1 that crystal 15 serves as a transmitting element and also as a detecting element, both channels 37 and 50 being connected thereto. In the broken away section of Fig. 2 is will be seen that an outer electrode 95, a thin metallic coating on the outer surface of cylinder 15, has been milled away as at a grooved section 96 so that a small portion 95a of the electrode 95 is electrically insulated from the lower portion.

Similarly the upper portion of the inner electrode 97 may be insulated from the lower portion. However since the inner electrode may be electrically common to both the driving and detecting portions of the crystal 15, the inner electrode 97 and conductor 98 are shown as electrically common to both channels 37 and 50 of Fig. 1. Conductor 99 connected to the insulated portion 95a forms, with conductor 98, the channel 50 of Fig. 1 while the conductor 100 connected to the lower portion of the electrode 95, together with conductor 98, forms the channel 37 of Fig. 1. Conductors 99 and 100 are threaded through the wall of the crystal cylinder 15 through bore holes 101 and 102, respectively. The conductors 98, 99 and 100 together with other conductors leading to the lower elements 16, 17, 18 and 19 of the system of Fig. 1 may then be threaded up through the central upper sections of the crystals and the intermediate spacing washers.

Since the variations in dimension of crystal 15 as produced by application of a signal from conductors 98 and 100 must also produce a variation in the dimensions of the portion contacted by electrode 95a, the voltage generated by such dimensional variations will be directly proportional thereto and thus available for utilization in the gain control circuit 51, 52 and 53. It will be apparent that other types of detectors may be used but the provision of he grooved cylinder is most desirable because of its simplicity and reliability. Strain gauge type detectors may be utilized. For example, a resistive element may be secured to the periphery of cylinder 15 and connected to the channel 50. Variations in the circumference of crystal 15 would then be sensed by the strain gauge element. Other such modifications may be found to be suitable.

Figure 4:
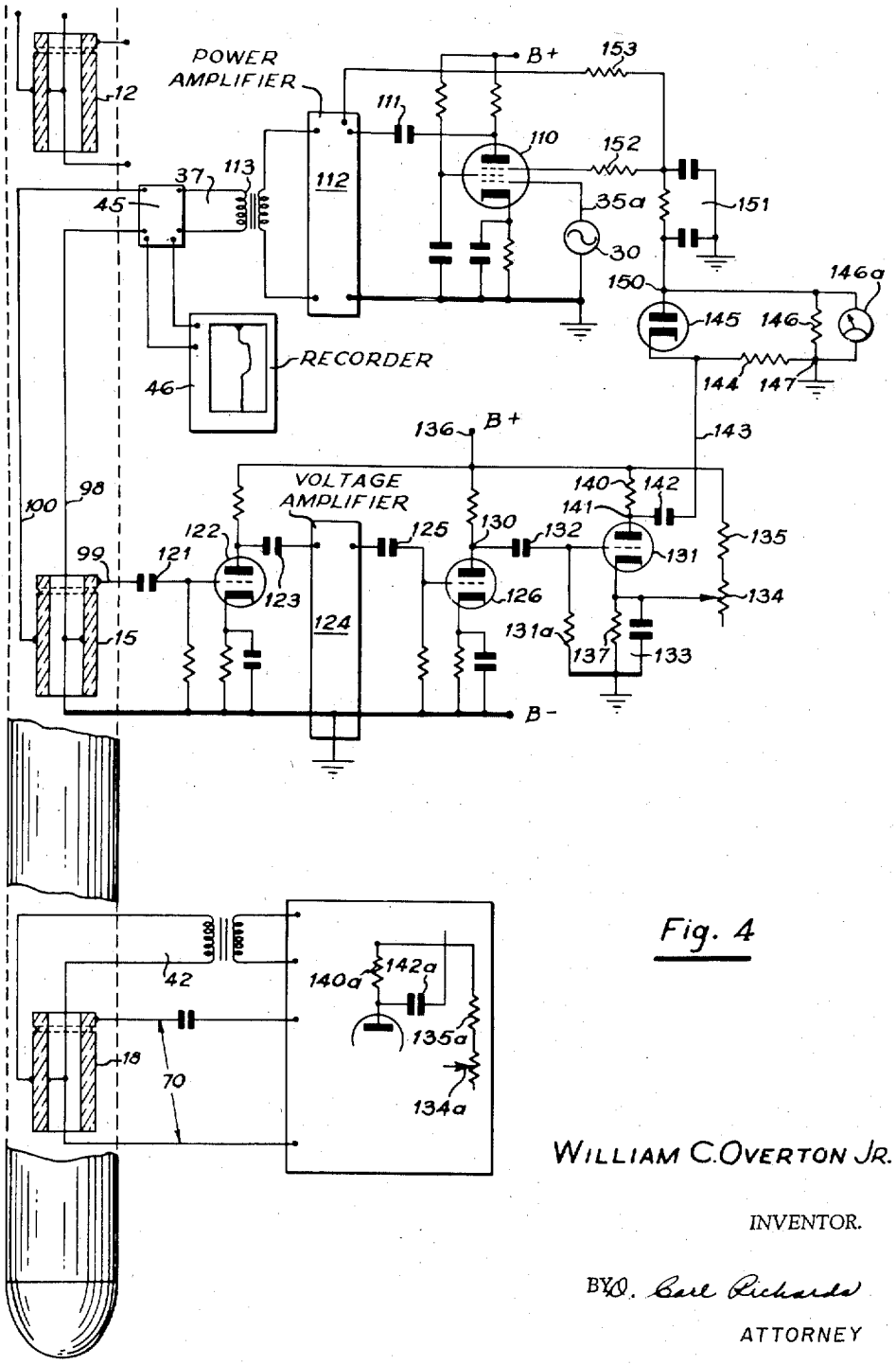
Fig. 4 is a schematic diagram of a portion of the driving system.

Referring now to Fig. 4, the power controlling system for the crystal 15 has been illustrated along with portions of corresponding circuits for the adjacent crystals 12 and 13. Where appropriate, the same reference characters have been used as in Figs. 1–3. The alternating current source 30 is connected by way of conductor 35a to the signal input grid of a pentode amplifier 110. The pentode amplifier stage 110 is conventional in construction, its output being coupled by way of condenser 111 to the power amplifier 112. The output of the power amplifier, having a frequency corresponding to that of the signal from the source 30 is connected by way of transformer 113 and channel 37 (conductors 98 and 100) to the inner and outer electrodes of the crystal 15. It will be noted that the outer surface of the crystal 15 is grooved near the upper end as explained in connection with Fig. 2 so that the upper portion of the outer electrode is electrically isolated from the lower portion. The signal on channel 37 drives the crystal 15 to produce the cylindrical wave for transmission through the bore hole liquids to adjacent formations. The energy applied to the crystal 15 is measured by the *wattmeter* [thermocouple element] 45 whose output is applied to the recorder 46.

The amplitude of vibration of the crystal 15, or the magnitude of the wave generated thereby, is detected by a circuit including conductor 99 and condenser 121 connected to the grid of a triode amplifier 122. The output of the triode amplifier 122 is coupled by way of condenser 123 to a voltage amplifier 124. The output of the voltage amplifier is then applied by way of condenser 125 to the control grid of a second triode amplifier 126.

The voltage at the anode of triode 126 is then utilized to derive a D.C. biasing voltage to control the gain of the pentode stage 110 and the power amplifier 112. More particularly, the alternating current signals at point 130 are applied to the control grid of a triode 131 by way of condenser 132. The triode 131 is provided with a grid resistor 131a and a cathode grid-biasing means 133. The grid of tube 131 is at all times negatively biased beyond plate current cutoff by means of a variable resistor circuit including resistors 134 and 135. More particularly, current from a source of supply flows from the B+ terminal 136 through resistors 135 and 134 and then downwardly through the cathode resistor 137 to ground, which corresponds with the negative side B—, of the source of supply. By suitably adjusting resistor 134, the magnitude of the current flowing through resistor 137 may be controlled thereby to determine the magnitude of the negative bias introduced into the grid circuit which, of course, includes resistors 137 and 131a. As will hereinafter be shown, a particular setting of the resistor 134 is selected to control at a preselected level the amplitude of vibration of the crystal 15.

The anode supply circuit for tube 131 includes a resistor 140 of relatively high value, for example in the order of 500,000 ohms. This relatively high resistance imparts poor voltage-regulation to the anode-supply circuit of the tube 131. In other words, when applied signals from tube 126 of predetermined amplitude render the tube 131 conductive, the resulting flow of unidirectional current through the resistor 140 produces a larger IR drop so that the point 141 drops to a very low value, approaching zero as the limit.

The output from the triode 131 is applied by way of a capacitor 142 and conductor 143 to a control network which includes a resistor 144 in one branch of the circuit, a diode rectifier 145 and a resistor 146 in another branch of the circuit, both of said branches leading to a ground terminal 147. It will be at once apparent that the charging circuit for the capacitor 142 may be traced from the positive source of B+ supply, the point 136, through resistor 140, capacitor 142, conductor 143 and resistor 144 to ground.

Though this charging circuit has been traced as between B+ and B— it is to be understood that the capacitor 142 is under the control of tube 131. When tube 131 is rendered conductive by a signal above a predetermined magnitude at the anode point 130 of tube 126, the voltage at point 141 drops to a small value. Hence the capacitor 142 discharges through resistor 144 and through the second branch of the circuit connected in parallel therewith which includes the diode 145 and the resistor 146. On the other hand, when the tube 131 is non-conductive, the voltage at point 141 is high and the capacitor 142 charges.

Due to the unidirectional or non-linear character of the rectifier 145 the current flowing through the second branch of the circuit, the rectifier 145 and the resistor 146, during the charging of the capacitor 142 is negligible. However the diode 145 does provide a discharge path parallel to resistor 144 for the condenser 142 which may be traced from point 141 through tube 131 and the bias circuit 133 to ground, and thence through resistor 146 (of approximately 2 megohms), the diode 145 and the other side of capacitor 142. Thus upon discharge of the condenser 142 a portion of the current flows through resistor 146 in a direction such that the side adjacent the point 150 is negative with respect to ground.

The negative voltage appearing at point 150 or as measured by meter 146a is then applied by way of a smoothing circuit 151 and a resistor 152 to the suppressor grid of the pentode amplifier stage 110. The voltage may also be applied by way of a circuit including resistor 153 to the power amplifier 112, in a gain-controlling relation, so that the power delivered to the transformer 113 from the source 30 is under the sole control of the voltage appearing between the conductor 99 connected to crystal 15 and a ground terminal.

In Fig. 4 it will also be seen that the crystal 18 is provided with a similar circuit, shown only in block diagram form with a fragmentary showing of the gain-power control network identical in construction and operation with the more detailed circuit shown for the crystal 15. The circuit for crystal 18 includes a variable resistor 134a whose function is identical with respect to the crystal 18 as resistor 134 with respect to crystal 15. The elements 140a, 142a, 135a similarly correspond to the elements of the circuit of crystal 15 having the same reference characters minus the suffix. A similar circuit, not shown, is provided for control of crystal 12. By adjustment of the setting of the variable resistor 134, 134a and the corresponding resistor for the circuit of the crystal 12 the amplitude of vibration of all of the crystals in the radiating unit, Fig. 1, are initially adjusted to the same level when the radiating unit is in a homogeneous medium such as in air or in a liquid filled bore hole at a point where the formation is homogeneous. Thereafter when the radiating unit is lowered past formations of differing character, the variations in the power requirements for maintaining constant the amplitude of vibration and thus maintaining the wave cylindrical in the region of crystals 14, 15, 16, will be sensed by the *wattmeter* [thermocouple element] 45 to produce a useful log. It is to be noted that the initial adjustment of the controlling resistors or the power delivered to the different radiating sections will not be exactly the same since the power requirements for the end or the guard sections comprised of crystals 11, 12, 13, 17, 18 and 19 will be *different* [differet] than for the central or probe section 14, 15 and 16 (Fig. 1). This is for the reason that there is end radiation associated with the end sections not present in the center section.

The foregoing gain control circuit has been presented by way of illustration only and not by way of limitation. Other forms of gain controlling circuits may be applied to control the magnitude of the vibration of the radiating elements as disclosed by applicant.

While the foregoing description relates specifically to the utilization of low frequency sinusoidal cylindrical waves, it will be apparent that other types of excitation may be used to advantage by providing the acoustic end guards driven in a predetermined relation with respect to an intermediate measuring or sensing system. Acoustic pulses may be found useful in contrast with the sinusoidal phenomena for which Equation 1 is valid. Still other modes of operation may also be found to be suitable in the production of acoustic logs of the acoustic properties of earth formations adjacent liquid filled bore holes by use of the end shielded system herein disclosed.

Figure 5:
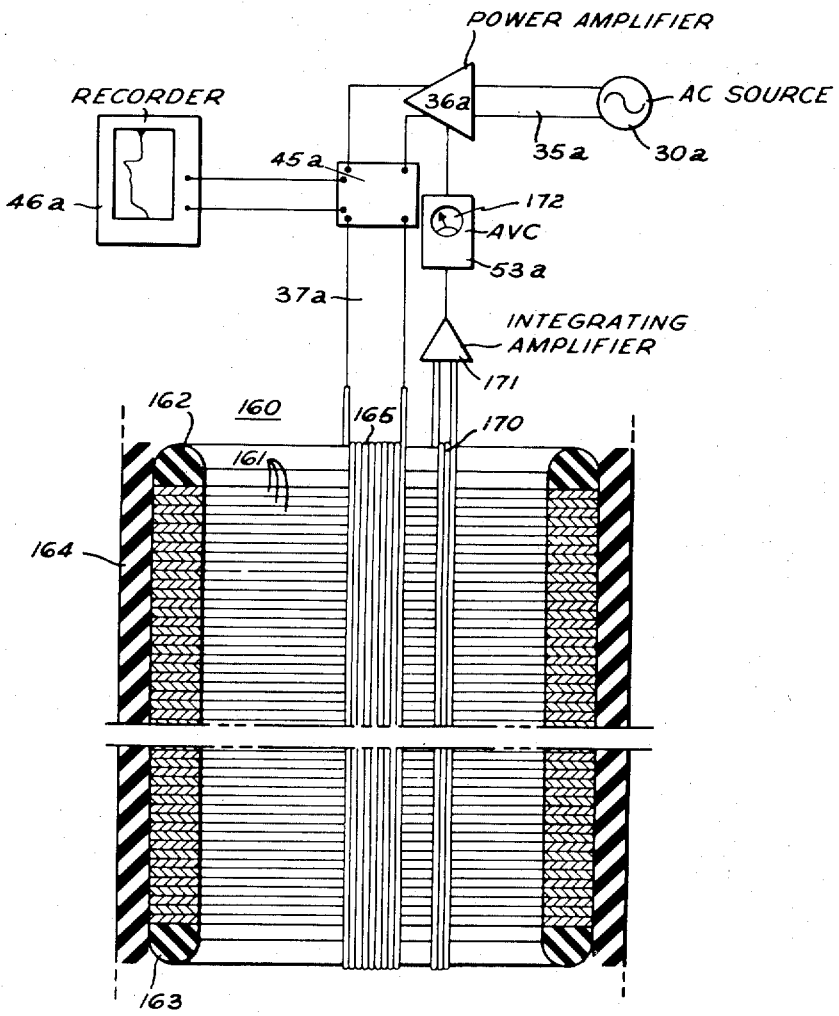
Fig. 5 is a modification of the invention.

In Fig. 5 there is disclosed a system which may be used in place of the crystal system of Fig. 1. For the purpose of simplicity, only one section has been shown and where appropriate, elements performing the same function as the elements of Fig. 1 have been given the same reference character with the suffix a.

Fig. 5 includes an elongated cylindrical structure 160 comprised of a plurality of flat rings 161 stacked end-to-end and suitably bound together as between a pair of end rings 162 and 163 of insulating material, such as Micarta or Bakelite. The rings 161 are of magnetostrictive material producing radial displacements upon excitation by magnetic flux for production of vibrational motion in surrounding medium. In this case, as in Fig. 1, a rubber sheath 164 is moulded around the exterior of the tubular member 160 for insulating it from fluids and for transmission of motion to the surrounding medium.

An alternating source 30a is connected by way of circuit 35a through an amplifier 36a and an input circuit 37a to a toroidal winding 165 on the elongated cylinder 160. While but a few turns have been shown as comprising the winding 165, it will be apparent that the entire periphery of the cylinder 160 may be covered with windings for producing an optimum flux density in the magnetostrictive elements for a given output from amplifier 36a. If desired, a unidirectional field may be imposed upon the magnetostrictive elements by application of a direct current component to the excitation of the winding 165. Such excitation has not been shown in Fig. 5, but the manner of so providing is well understood by those skilled in the art. However, the [remanant] *remanent* magnetism of the magnetostrictive element is sufficient that alternating current alone applied to the windings 165 produces desired radial displacements for production of acoustic waves. As in Fig. 1, a *wattmeter* [thermocouple element] 45a is connected to a recorder 46a to produce a record of the power parameter of the excitation of the magnetostrictive elements 161.

A detector winding 170 is coupled in inductive relation to the magnetostrictive elements for detecting the flux density in the magnetostrictive elements as a measure of displacement. Since displacements are proportional to the derivative of flux density, the voltage induced in coil 170 must be integrated to produce an output voltage which is a measure of displacement. The integrating amplifier 171, of the types known to the art, produces an output function for application to the automatic volume control circuit 53a. The latter circuit, as explained in connection with Fig. 1, may control the output of the power amplifier 36a for maintaining the acoustic level in media adjacent the cylinder 160 at a constant level.

The auxiliary circuits and additional driving cylinders shown in Fig. 1 may be substantially duplicated with magnetostrictive elements of the type illustrated in Fig. 5. The system of Fig. 5 may be utilized in place of the elements of Fig. 1 with an added advantage that the magnetostrictive elements are not temperature sensitive and may possibly be operated in certain well logging operations where temperatures too extreme for crystal operation are encountered.

It will now be apparent that a single toroid of substantial length, 10 or 12 hole diameters, may be excited from a single source as illustrated in Fig. 5, and measurement made of the displacement of a short central section, as by inductively coupling a pick-up coil, such as the coil 170, to a limited number of centrally located magnetostrictive laminations for measurements of displacements, or amplitude of vibrational energy transmitted to adjacent formations as by meter 172 which indicates the magnitude of the AVC voltage or by recording the energy function on the recorder 46a. The coil 170 preferably is coupled to the portion of the driven member at its center as to be substantially unaffected by end radiation effects. It will further be apparent that data concerning the properties of the formations new and distinct from that produced by prior art systems may be obtained by measurement of the magnitude of the voltage in coil 170, such coil occupying but a portion of the central laminations of the transducer 160 if a constant amplitude voltage is applied from source 30a to winding 165 as contrasted to the mode of operation in which the energy is maintained constant.

While preferred embodiments of the invention have been described, it will be understood that other modifications may now suggest themselves to those skilled in the art, and it is intended to cover such modifications as fall within the scope of the invention set forth in the appended claims.

What is claimed is:

1. In acoustic logging where an exploring element is used to log a liquid filled bore hole, the method which comprises driving said element to generate an axially symmetric wave, with said element in a homogeneous medium, independently adjusting the amplitude of said wave at different points along said element to a predetermined level, moving said element through said bore hole and past the formations adjacent thereto to modify said wave over the length of said element in dependence upon acoustic properties of said formations, and generating a signal representative of variations in said wave in a preselected intermediate fraction of the length of said element for determination of variations in said acoustic properties.

2. In acoustic logging where an exploring element is used to log a liquid filled bore hole, the method which comprises driving said element to generate an axially symmetric cylindrical wave acoustically to couple the formations adjacent said borehole to said element, independently adjusting the magnitude of said wave at different points along said element to a predetermined level moving said element through said bore hole and past the formations adjacent thereto to vary the energy required to maintain constant the amplitude of said wave over the length of said element in dependence upon acoustic properties of said formations, and generating a signal representative of variations in said energy supplied to a preselected intermediate fraction of the length of said element for determination of variations in said acoustic properties.

3. In acoustic logging where an exploring element is used to log a liquid filled bore hole, the method which comprises driving a first portion of said element for generation of an axially symmetric wave acoustically to couple formations adjacent said first portion to said element, separately driving adjacent portions of said element above and below said first portion for generation of axially symmetric waves in phase with the wave from said first portion to couple adjacent formations to said adjacent portions of said element, independently adjusting the amplitude of the waves from all of said portions to substantially the same level to assure a wave closely purely cylindrical in form adjacent said first portion, moving said element through said bore hole and past the formations adjacent thereto to modify the waves from said portions of said element in dependence upon acoustic properties of adjacent formations, and generating a signal representative of variations in the wave from said first portion for determination of variations in said acoustic properties of formations adjacent said first portion.

4. In acoustic logging where an exploring element is used to log a liquid filled bore hole, the method which comprises driving a first portion of said element for generation of an axially symmetric wave acoustically to couple formations adjacent said portion to said element, separately driving adjacent portions of said element above and below said first portion for generation of axially symmetric waves corresponding in phase with the wave from said first portion to couple adjacent formations to further portions of said element, independently adjusting the magnitude of the waves from all of said portions to substantially the same magnitude to assure a cylindrical wave in formations adjacent said first portion, moving said element through said bore hole past the formations adjacent thereto to vary the energy required to maintain constant the amplitude of said waves from each of said portions in dependence upon acoustic properties of formations adjacent the respective portions, and generating a signal representative of variations in said energy supplied to said first portion for determination of variations in said acoustic properties.

5. A system for measuring changes in the acoustical character of formations penetrated by a liquid filled bore hole which comprises an exploring element which includes a plurality of cylindrical radiating members supported in end-to-end relation, means for separately driving said cylindrical members in phase for generation of axially symmetric acoustic waves, control means for maintaining the amplitude of said waves from each of said radiating members at a preselected value to produce a wave truly cylindrical in character along at least an intermediate member of said exploring element, means for moving said exploring element through said bore hole to modify the portions of said wave from said individual radiating members in dependence upon the acoustic properties of formations immediately adjacent each portion, and means for measuring variations in the wave from said intermediate member for determination of variations in the acoustic properties of formations adjacent thereto.

6. A system for measuring changes in the acoustical character of formations penetrated by a liquid filled bore hole which comprises a first radiating member, a source of low frequency alternating current, a first power controlling network connected between said radiating member and said source for driving said member to produce a low frequency axially symmetric sinusoidal wave, a second radiating member adjacent one end of said first member, a power controlling network interconnecting said source and said second radiating member, a third radiating member adjacent the other end of said first member, a third power controlling network interconnecting said source and said third member, means responsive to the vibration of each of said members for producing alternating current voltages, gain control means respectively responsive to each of said voltages and coupled to the power controlling networks in a gain controlling relation for individually controlling the amplitude of the vibration of each of said members, means in each of said gain control means for adjusting the amplitudes of vibrations of associated members to a preselected value to produce a wave cylindrical in character along the entire length of said first member, means for moving said elements in end-to-end relation through said bore hole to modify the energy required from each of said power controlling networks to maintain constant the amplitudes of said waves, and means for measuring variations in the energy applied to said first member for determination of variations in the acoustic properties of formations adjacent said first member.

7. An acoustic well logging system for measuring properties of formations penetrated by a liquid filled well bore which comprises a plurality of piezoelectric elements supported in an end-to-end array and dimensionally variable in a direction normal to the longitudinal axis of said array, driving means connected to said elements for separately driving said elements for producing such dimensional variations, means for independently adjusting the dimensional variations of said elements to substantially the same magnitude, means for moving said elements in said end-to-end relation through said bore hole for transmission through said liquid to said formations of acoustic waves due to said dimensional variations longitudinally uniform adjacent at least the centrally located elements, and detecting means coupled to one of said centrally located elements whereby measurement of said waves may be made independently of radiation along the axis of said well bore from the elements at the ends of said array.

8. An acoustic well logging system for measuring properties of formations penetrated by a liquid filled well bore which comprises a plurality of cylindrical piezoelectric elements supported in an end-to-end array and dimensionally variable in a direction normal to the longitudinal axis of said array, driving means connected to said elements for separately driving said elements for producing such dimensional variations, means for independently adjusting the dimensional variations of said elements to substantially the same magnitude, means for moving said elements in said end-to-end relation through said bore hole for transmission through said liquid to said formations of acoustic waves due to said dimensional variations cylindrical adjacent at least the centrally located elements, and detecting means coupled to one of said centrally located elements whereby measurement of said waves may be made independently of radiation along the axis of said well bore from the elements at the ends of said array.

9. An acoustic well logging system for measuring properties of formations penetrated by a liquid filled well bore which comprises a plurality of transducers stacked in an end-to-end array and variable dimensionally in a direction normal to the axis of said array, driving means for separately exciting each of said transducers to produce such dimensional variations, means for independently adjusting the dimensional variations of said elements to substantially the same magnitude, supporting means for moving said transducers through said bore hole for transmission through said liquid to said formations of acoustic waves due to said dimensional variations uniform in nature at least adjacent the centrally located transducers, and detecting means coupled to one of said centrally located transducers whereby said waves may be measured independently of radiation from the transducers positioned at the ends of said array.

10. A system for measuring changes in the acoustical character of formations penetrated by a liquid filled bore hole which comprises an exploring element including a plurality of radiating members supported in end-to-end relation, means for driving said plurality of radiating members in phase for generation of axially symmetric acoustic waves, automatic gain control means connected between selected ones of said radiating members and said driving means and responsive to the magnitudes of the waves from each of said members respectively to control the driving means for each of said members and for maintaining substantially at said preselected value the amplitude of the wave over the entire length of said element, means for adjusting the amplitude of said waves generated by each of said members to said preselected value to produce a wave cylindrical in character along an intermediate fraction of the length of said exploring element, means for moving said exploring element through said bore hole to modify the portions of the wave from said individual radiating members in dependence upon the acoustic properties of formations immediately adjacent each portion, said automatic gain control means being responsive to modification of said waves from said intermediate fraction to vary said driving means to return the amplitude of said waves to said preselected value and means for measuring variations in the driving means for the members in said intermediate fraction for determination of variations of the acoustic properties of formations adjacent said fraction.

11. A system for measuring changes in the acoustical character of formations penetrated by a liquid filled bore hole which comprises an exploring element which includes an intermediate radiating member and radiating members supported at each end of said radiating member in an end-to-end relation, low frequency means for driving said radiating members in phase for generation of axially symmetric acoustic waves, automatic gain control means responsive to the amplitudes of vibration of said radiating members respectively connected in gain controlling relation to the low frequency driving means for said members to maintain constant the amplitudes of the vibration of the waves from said members, means for adjusting the amplitude of the waves from each of said radiating members to said constant amplitude to produce a wave cylindrical in character at least along the fraction of the length of said exploring element corresponding to the location of said intermediate radiating member, means for moving said exploring element through said bore hole to modify the portions of said wave from said radiating members in dependence upon the acoustic properties of formations immediately adjacent each member, said automatic gain control means being responsive to modification of said waves to vary the energy output of said low frequency driving means to maintain constant the amplitude of the waves from said intermediate member, and means for measuring variations in the energy required to maintain constant the amplitude of the wave from said intermediate member for determination of variations in the acoustic properties of formations adjacent said intermediate member.

*12. An acoustic well logging system for measuring properties of formations penetrated by a liquid filled well bore comprising a housing adapted to be lowered into the well bore, a plurality of transmitting elements mounted within said housing and comprised of barium-titanate cylinders disposed coaxially with said housing, electrodes disposed within said housing, one electrode being disposed about the inside periphery of each cylinder and a second electrode being disposed about the outside periphery of each cylinder, means for causing simultaneous continuous expansion and contraction of said*

*barium-titanate cylinders for sending continuous acoustic waves through said formations, detecting means located coaxially within said housing and between transmitting elements, and means for obtaining an electrical signal from said detecting means indicative of the type of formations traversed by said housing.*

*13. An acoustic well logging system as in claim 12 in which said detecting means includes a barium-titanate member having inside and outside surfaces, said member being positioned within said housing and coaxially therewith, an electrode disposed on the inside surface of said member and an electrode disposed on the outside surface of said member.*

*14. An acoustic well logging system for measuring properties of formations penetrated by a liquid filled well bore which comprises a plurality of crystal transducers stacked in an end-to-end array and variable dimensionally in a direction normal to the axis of said array, driving means for separately exciting each of said transducers to produce such dimensional variations, means for adjusting the dimensional variations of said transducers to substantially the same magnitude, supporting means for moving said transducers through said bore hole for transmission through said liquid to said formations of acoustic waves due to said dimensional variations uniform in nature at least adjacent the centrally located transducers, and detecting means positioned centrally of said transducers for generation of an electric signal independent of radiation from the transducers positioned at the ends of said array.*

*15. An acoustic well logging system for measuring properties of formations penetrated by a liquid filled well bore comprising a housing adapted to be lowered into the well bore, a plurality of transmitting elements mounted within said housing and comprised of piezoelectric cylinders disposed coaxially with said housing, electrodes disposed within said housing, one electrode being disposed about the inside periphery of each cylinder and a second electrode being disposed about the outside periphery of each cylinder, means for causing simultaneous continuous expansion and contraction of said piezoelectric cylinders for sending continuous acoustic waves through said formations, detecting means located coaxially within said housing and between transmitting elements, and means for obtaining an electrical signal from said detecting means indicative of the type of formations traversed by said housing.*

*16. An acoustic well logging system for measuring properties of formations adjacent a bore hole comprising a housing adapted to be lowered into the bore hole, a piezoelectric sound transmitting means mounted within said housing and including at least one piezoelectric transmitter, a piezoelectric detector mounted within said housing, the arrangement being such that the longitudinal extremities of the sound transmitting means extend above and below the longitudinal extremities of the piezoelectric detector, means for causing the continuous expansion and contraction of said piezoelectric sound transmitting means, and means for obtaining an electric signal from said piezoelectric detector indicative of the type of formations traversed by said housing.*

References Cited in the file of this patent or the original patent

UNITED STATES PATENTS

| | | |
|---|---|---|
| 2,190,686 | Slichter | Feb. 20, 1940 |
| 2,405,187 | Benioff | Aug. 6, 1946 |
| 2,434,648 | Goodale | Jan. 20, 1948 |
| 2,530,971 | Kean | Nov. 21, 1950 |
| 2,586,745 | Tullos | Feb. 19, 1952 |
| 2,633,484 | Zimmerman | Mar. 31, 1953 |
| 2,649,163 | Atkins | Aug. 18, 1953 |
| 2,894,597 | Kean et al. | July 14, 1959 |